UNITED STATES PATENT OFFICE.

SIDNEY M. CADWELL, OF NEW YORK, N. Y., ASSIGNOR TO THE NAUGATUCK CHEMICAL COMPANY, A CORPORATION OF CONNECTICUT.

VULCANIZATION OF RUBBER EMPLOYING AMINES AND OPEN-CHAIN ALDEHYDES AND SIMILAR SUBSTANCES AND PRODUCTS OBTAINED THEREBY.

1,417,970.     Specification of Letters Patent.    Patented May 30, 1922.

No Drawing. Continuation of application Serial No. 376,659, filed April 26, 1920. This application filed May 28, 1921. Serial No. 473,345.

*To all whom it may concern:*

Be it known that I, SIDNEY M. CADWELL, a citizen of the United States, residing in New York, county and State of New York, have invented certain new and useful improvements in vulcanization of rubber employing amines and open-chain aldehydes and similar substances and products obtained thereby, of which the following is a full, clear, and exact description.

This invention relates to vulcanization of rubber or similar materials such as balata, gutta percha and rubber substitutes. It is more particularly directed to the vulcanization of rubber employing amines and open chain aldehydes and similar substances. The invention also includes the products of such processes.

Aldehyde amine condensation products have heretofore been used in the vulcanization of rubber. Among compounds of this type which have been employed are methylene aniline and methylene diphenyldiamine set forth in French patent to Bastide, No. 470,883. These materials are condensation products of formaldehyde and cyclic amines. In addition British patent to Peachey, 7370 of 1914 sets forth aldehyde amine condensation products including aldehyde ammonia, benzylidine aniline, formaldehyde aniline and benzylidine ethylamine. It has been found that these accelerators are relatively inactive and further that the accelerator aldehyde ammonia is unstable and poisonous.

It is accordingly an object of this invention to provide a process for vulcanization employing non-toxic, stable materials of the type mentioned, which shall permit the employment of a shorter time for the same quantity of accelerator than heretofore employed or the employment of a smaller quantity of the accelerator than heretofore employed and approximately the same time. It is also an object of the invention to provide a process of the type mentioned which will not cause over-vulcanization as readily as with other accelerators heretofore known. Another object of the invention is to provide a process of the kind described employing materials with which prevulcanization in milling is substantially avoided. Another object of the invention is to provide a process of the kind described which shall employ accelerators which may be made of relatively inexpensive raw materials. Another object of the invention is to provide a vulcanized product having good ageing properties, high tensile strength, toughness, freedom from bad odor and freedom from poisonous qualities. Another object of the invention is to provide a process employing accelerators made from nitrogenous materials such as aromatic amines having a relatively low accelerating value in themselves combined with other materials having in themselves little or no accelerating value, to produce acceleration of great rapidity.

This application is a continuation of my former application Serial No. 376,659, filed April 26, 1920.

The invention accordingly consists in a process of treating rubber or similar materials which comprises combining the rubber with a vulcanizing ingredient and the reaction product of an open carbon chain aldehyde having a plurality of carbon atoms and an amine and vulcanizing the rubber. The invention also includes the product of such process.

In its preferred embodiment 100 parts of rubber, 10 parts of zinc oxide, 3 parts of sulphur and 0.5 part of the condensation product of aniline and heptaldehyde are mixed together by milling on rolls in the usual manner and vulcanizing in a press under 40 pounds steam pressure for 60 minutes.

The reaction product of heptaldehyde and aniline may be prepared by mixing equal molecular amounts of aniline and heptaldehyde, adding a quantity of sulphur equal to 5% of the weight of the mixture, and heating to 140° C, until the water formed in the course of reaction has been evaporated off. The sulphur is here employed to remove any objectionable odor which may appear in the condensation product of aniline and heptaldehyde. Other substances may be employed for the removal of such odor as desired.

As another example constituting an embodiment of the invention 100 parts of rubber, 10 parts of zinc oxide, 3 parts of sulphur and 0.5 part of the reaction product of acetaldehyde and aniline are mixed together and compounded by milling in the usual manner. The resulting mixture may be cured in a mold with steam at 40 pounds pressure for 60 minutes.

Equal weights of aniline and water are mixed and an excess of acetaldehyde are run in while the mixture is stirred vigorously. When reaction is complete the water and excess chemicals are evaporated off preferably in vacuum using steam to furnish the heat. The residue is heated until it has a consistency that will soften under the continued pressure of the hand and fracture if struck a sharp blow.

The products of reaction between aniline and heptaldehyde and aniline and acetaldehyde are examples of a large number of similar substances which may be similarly employed in the vulcanization of rubber. The processes for employing these various materials are substantially identical with those already set forth, that is a typical process consists in mixing 100 parts of rubber, 10 parts of zinc oxide, 3 parts of sulphur, and 0.5 part of the reaction product of the aldehyde and amine, and vulcanizing under 40 lbs. pressure for 60 minutes. The proportions mentioned in this formula may be varied as desired to produce variously compounded rubbers.

The quantity of the reaction product employed may vary from 0.2—0.5 part. 0.2 part is ordinarily used when employing the aldehyde condensation product of aliphatic amines such for example as acetaldehyde and monoethylamine, etc. More of the accelerator may be employed if desired.

It is further pointed out that the time of cure will vary with the thickness of the rubber article undergoing vulcanization. In the examples given the thicknesses of materials are generally about $\frac{1}{16}''$.

The similar substances are as follows:—

Acetaldehyde meta nitraniline, acetaldehyde benzidine, acetaldehyde metatoluylenediamine, acetaldehyde triamidotoluol, acetaldehyde hydroxylamine, acetaldehyde phenylhydrazene, polyheptylidine aniline, duodecylidine aniline, stearic aldehyde aniline, octylaldehyde aniline, nonylaldehyde aniline, heptaldehyde para toluidine, heptaldehyde naphthylamine, isobutylaldehyde aniline, cinnamaldehyde aniline, citronellal aniline, valeraldehyde aniline, propionaldehyde aniline, heptaldoxime, dextrosazone, glucose aniline, glucose ammonia, acetaldehyde monomethylaniline, acetaldehyde aniline, acetaldehyde o-toluidine, acetaldehyde p-toluidine, acetaldehyde p-phenylenediamine butylaldehyde p-toluidine, butylaldehyde aniline, acetaldehyde urea, acetaldehyde B-naphthylamine, acetaldehyde p-nitraniline, acetaldehyde diphenylamine, acetaldehyde acetphenylenediamine, heptaldehyde diethylamine, heptaldehyde benzylamine, cinnamaldehyde ethylamine, heptaldehyde methylamine, heptaldehyde ethylamine, valeraldehyde ethylamine, propionaldehyde ethylamine, acetaldehyde benzylamine, acetaldehyde methylamine, butylaldehyde ethylamine, butylaldehyde diethylamine, acetaldehyde ethylamine, acetaldehyde diethylamine.

The tensile strengths of rubbers produced by the processes employing the reaction products indicated and constituting the present invention are high when compared with the tensile strengths of similar rubber similarly compounded. With formaldehyde aromatic amine condensates it will be found that the tensile strengths of the materials employed in the present invention are approximately 33% greater than such condensates when, for example, the preferred embodiment is employed. Tensile strengths obtained in rubbers by the present invention are about 75% greater than those produced by aromatic aldehyde aromatic amine condensates produced and tested under similar conditions. In order to produce as high tensile strengths in the rubber products of the formaldehyde and aromatic amine and aromatic aldehyde amine condensates, it is necessary to use much larger quantities of these accelerators. The processes of the present invention are hence less expensive and more efficient in their reaction than the other processes noted.

It is pointed out that the accelerators mentioned may in general be prepared by treating any primary or secondary amine with the aldehyde in any solvent and isolating the resulting product. The reaction should not be carried out in strong acid solution. The product usually obtained is an oil but it is possible to prepare certain of the compounds in pure crystalline form. Their preparation in the form of an oil is preferable since an oil is more easily incorporated with rubber. It will be understood that applicant does not intend to limit himself in the claims to any particular method of preparation of the accelerators that is by condensation of aldehydes and amines, but that it is intended to cover processes of vulcanization employing accelerators having the same or similar constitution or compositions as the aldehyde amine reaction products. It is pointed out for example that in the condensates of acetaldehyde orthotoluidine more than one reaction product may be formed and accelerating action may be due in part at least to one or more of these products.

It will be observed that the products listed above are in general combinations of primary and secondary amines and straight chain aldehydes, some of which as in the case of cinnamaldehyde aniline have a benzene ring linked to the straight chain but having the aldehyde group linked to one of the carbon atoms of the straight chain. Based on tensile strength determination of the members of the list given above the following appear to accelerate vulcanization more satisfactorily than other members of the group:

Polyheptylidine aniline, heptaldehyde para toluidine, heptaldehyde naphthylamine, isobutylaldehyde aniline, cinnamaldehyde aniline, citronellal aniline, valeraldehyde aniline, propionaldehyde aniline, acetaldehyde monomethylaniline, acetaldehyde aniline, acetaldehyde o-toluidine, acetaldehyde p-toluidine, acetaldehyde p-phenylenediamine, butylaldehyde p-toluidine, butylaldehyde aniline, heptaldehyde diethylamine, heptaldehyde benzylamine, cinnamaldehyde ethylamine, heptaldehyde methylamine, heptaldehyde ethylamine, valeraldehyde ethylamine, propionaldehyde ethylamine, acetaldehyde benzylamine, acetaldehyde methylamine, butylaldehyde ethylamine, butylaldehyde diethylamine, acetaldehyde ethylamine, acetaldehyde diethylamine.

Observing these results of acceleration as evidenced by the tensile strength it appears that the preferred members of the list of products given are products of primary and secondary amines having an electrolytic dissociation constant determined in water greater than $1 \times 10^{-12}$ combined with aldehydes having the aldehyde group attached to a carbon which is not a member of a ring and constituting one of a series of carbons in a hydrocarbon chain, the carbon atoms in this chain ranging in number from 2 to 7.

It is pointed out that the process of acceleration may be carried out as set forth in my co-pending application Serial No. 376,659, filed April 26, 1920, that is the ingredients that constitute the accelerator may be added separately for example aniline and heptaldehyde may be combined separately with portions of rubber, and the separate portions may then be mixed and vulcanized. If desired the various accelerators herein mentioned may be combined with sulphur prior to the combination thereof with rubber by heating equal weights of sulphur and accelerator used at about 140° C. for 2 hours or more, hydrogen sulphide being evolved. The resulting product accelerates vulcanization of rubber in a manner similar to acceleration produced employing the products listed above.

It will be observed in the examples given above that zinc oxide has been employed with other materials for acceleration. The zinc oxide may be omitted however but if omitted the time of vulcanization is preferably slightly lengthened. An example of such a vulcanization is as follows: 100 parts of rubber, 8 parts of sulphur, 0.5 parts of the condensation product of heptaldehyde and aniline are mixed on the rolls in the usual manner and cured in a mold under pressure for 75 minutes.

Instead of adding an amine with heptaldehyde or other similar aldehyde as herein set forth, the amine naturally occurring in the rubber may be used to cause with the aldehyde a rapid acceleration. 100 parts of a rubber in which substantially the normal amine content of the latex has been retained, 10 parts of zinc oxide, 3 parts of sulphur and 1 part of heptaldehyde are mixed on the rolls in the usual manner and cured under 40 pounds steam pressure in a press for 60 minutes.

The process employing the accelerators heretofore set forth in general permit a smaller quantity of accelerator to be employed for vulcanization in a time approximately the same as that heretofore employed in connection with the formaldehyde amine condensation products etc. heretofore mentioned. Similar processes of the invention will permit the vulcanization of rubber in a shorter time if quantities of the accelerator are employed equal to that ordinarily employed heretofore with formaldehyde amine condensation products etc. The present process further substantially avoids over-vulcanization and shows no tendency to prevulcanization when the rubber is milled on hot rolls in the usual manner. It will be observed that the process employs reaction products made from materials which in themselves are inexpensive and cause little or no acceleration. For example aniline, which is relatively inexpensive compared with the aliphatic amines, and constitutes a relatively slow accelerator, is combined with heptaldehyde and various other aldehydes which in themselves accelerate little if any, to provide rapid accelerators. The accelerators themselves employed are made from relatively inexpensive raw materials. The rubber products produced by the processes of this invention present valuable physical properties such as good resistance to ageing, good resilience, high tensile strength, freedom from odor and freedom from toxicity.

As many apparently widely different embodiments of this invention may be made without departing from the spirit thereof, it will be understood that I do not intend to limit myself to the specific embodiment herein set forth except as indicated in the appended claims.

Each of the compounds enumerated in the specification has been tested in the vulcanization of rubber and has been found to possess the properties described.

Having thus described my invention, what

I claim and desire to protect by Letters Patent is:

1. A process for treating rubber which comprises combining rubber with a vulcanizing agent and the reaction product of an aldehyde comprising an open chain having a plurality of carbon atoms, and an amine, and vulcanizing the rubber.

2. A process for treating rubber which comprises combining rubber with a vulcanizing agent and the reaction product of an aldehyde having from 2 to 7 carbon atoms in an open hydrocarbon chain, and an amine, and vulcanizing the rubber.

3. A process for treating rubber which comprises combining rubber with a vulcanizing agent and the reaction product of an aldehyde having 7 carbon atoms in a straight hydrocarbon chain, and a nitrogenous material, and vulcanizing the rubber.

4. A process for treating rubber which comprises combining rubber with a vulcanizing agent and the reaction product of heptaldehyde, and an amine, and vulcanizing the rubber.

5. A process for treating rubber which comprises combining rubber with a vulcanizing agent and the reaction product of a straight chain aldehyde having a plurality of carbon atoms, and a cyclic amine, and vulcanizing the rubber.

6. A process for treating rubber which comprises combining rubber with a vulcanizing agent and the reaction product of an aldehyde comprising a straight hydrocarbon chain having a plurality of carbon atoms, and an aromatic amine, and vulcanizing the rubber.

7. A process for treating rubber which comprises combining rubber with a vulcanizing agent and the reaction product of an aldehyde comprising a straight hydrocarbon chain having a plurality of carbon atoms and an amine having an electrolytic dissociation constant greater than $1 \times 10^{-12}$, and vulcanizing the rubber.

8. A process for treating rubber which comprises combining rubber with a vulcanizing agent and the reaction product of an aldehyde having 2 to 7 atoms in a straight hydrocarbon chain, and a cyclic amine, and vulcanizing the rubber.

9. A process for treating rubber which comprises combining rubber with a vulcanizing agent and the reaction product of an aldehyde having 2 to 7 atoms in a straight hydrocarbon chain, and an amine having an electrolytic dissociation constant greater than $1 \times 10^{-12}$, and vulcanizing the rubber.

10. A process for treating rubber which comprises combining rubber with a vulcanizing agent and the reaction product of an aldehyde having 2 to 7 atoms in a straight hydrocarbon chain, and an aromatic amine, and vulcanizing the rubber.

11. A process for treating rubber which comprises combining rubber with a vulcanizing agent and the reaction product of heptaldehyde, and an aromatic amine, and vulcanizing the rubber.

12. A process for treating rubber which comprises combining rubber with a vulcanizing agent and the reaction product of heptaldehyde, and aniline, and vulcanizing the rubber.

13. A process for treating rubber which comprises combining rubber with a vulcanizing agent and the reaction product of acetaldehyde, and an aromatic amine, and vulcanizing the rubber.

14. A process for treating rubber which comprises combining rubber with a vulcanizing agent and the reaction product of acetaldehyde and aniline, and vulcanizing the rubber.

15. A process for treating rubber which comprises combining rubber with a vulcanizing agent and the reaction product of an aldehyde comprising a straight hydrocarbon chain having a plurality of carbon atoms and an aliphatic amine, and vulcanizing the rubber.

16. A process for treating rubber which comprises combining rubber containing amine as a normal constituent with aldehyde, and vulcanizing the rubber.

17. A process for treating rubber which comprises combining rubber containing amine as a normal constituent with heptaldehyde, and vulcanizing the rubber.

18. A rubber derived from rubber or similar materials combined with the reaction product of an aldehyde comprising a hydrocarbon chain having a plurality of carbon atoms, and an amine, and vulcanized.

19. A rubber derived from rubber or similar materials combined with the reaction product of an aldehyde having 2 to 7 carbon atoms in a straight hydrocarbon chain, and an amine, and vulcanized.

20. A rubber derived from rubber or similar materials combined with the reaction product of an aldehyde having 7 carbon atoms in a straight hydrocarbon chain, and a nitrogenous material, and vulcanized.

21. A rubber derived from rubber or similar materials combined with the reaction product of heptaldehyde, and an amine, and vulcanized.

22. A rubber derived from rubber or similar materials combined with the reaction product of a straight chain aldehyde having a plurality of carbon atoms, and a cyclic amine, and vulcanized.

23. A rubber derived from rubber or similar materials combined with the reaction product of a straight chain aldehdye having a plurality of carbon atoms, and an aromatic amine, and vulcanized.

24. A rubber derived from rubber or similar materials combined with the reaction product of a straight chain hydrocarbon having a plurality of carbon atoms, and an amine having an electrolytic dissociation constant greater than $1 \times 10^{-12}$, and vulcanized.

25. A rubber derived from rubber or similar materials combined with the reaction product of an aldehyde having 2 to 7 atoms in a straight hydrocarbon chain, and a cyclic amine, and vulcanized.

26. A rubber derived from rubber or similar materials combined with the reaction product of an aldehyde having 2 to 7 atoms in a straight hydrocarbon chain, and an amine having an electrolytic dissociation constant greater than $1 \times 10^{-12}$, and vulcanized.

27. A rubber derived from rubber or similar materials combined with the reaction product of an aldehyde having 2 to 7 atoms in a straight hydrocarbon chain, and an aromatic amine, and vulcanized.

28. A rubber derived from rubber or similar materials combined with the reaction product of heptaldehdye, and an aromatic amine, and vulcanized.

29. A rubber derived from rubber or similar materials combined with the reaction product of heptaldehdye, and aniline, and vulcanized.

30. A rubber derived from rubber or similar materials combined with the reaction product of acetaldehyde, and an aromatic amine, and vulcanized.

31. A rubber derived from rubber or similar materials combined with the reaction product of acetaldehyde, and aniline, and vulcanized.

32. A rubber derived from rubber or similar materials combined with the reaction product of an aldehyde comprising a straight hydrocarbon chain having a plurality of carbon atoms, and an aliphatic amine, and vulcanized.

Signed at New York, N. Y., this 26 day of May, 1921.

SIDNEY M. CADWELL.